(12) United States Patent
Drbohlav et al.

(10) Patent No.: US 10,604,039 B2
(45) Date of Patent: Mar. 31, 2020

(54) CUSHION COVER, IN PARTICULAR FOR A VEHICLE SEAT, AND METHOD FOR PRODUCING A CUSHION COVER

(71) Applicant: Adient Luxembourg Holding S.à.r.l, Luxembourg (LU)

(72) Inventors: Tomás Drbohlav, Liberec (CZ); Tereza Kunclova, Plzen (CZ)

(73) Assignee: Adient Luxembourg Holding S.à r.l., Luxembourg (LU)

( * ) Notice: Subject to any disclaimer, the term of this patent is extended or adjusted under 35 U.S.C. 154(b) by 242 days.

(21) Appl. No.: 15/519,674

(22) PCT Filed: Oct. 9, 2015

(86) PCT No.: PCT/EP2015/073373
§ 371 (c)(1),
(2) Date: Apr. 17, 2017

(87) PCT Pub. No.: WO2016/058921
PCT Pub. Date: Apr. 21, 2016

(65) Prior Publication Data
US 2017/0240080 A1 Aug. 24, 2017

(30) Foreign Application Priority Data

Oct. 17, 2014 (DE) .......... 10 2014 221 125
May 21, 2015 (DE) .......... 10 2015 209 332

(51) Int. Cl.
*B60N 2/58* (2006.01)
*B44C 1/24* (2006.01)
*B44B 5/02* (2006.01)

(52) U.S. Cl.
CPC ............. *B60N 2/58* (2013.01); *B44B 5/026* (2013.01); *B44C 1/24* (2013.01); *B60N 2/5891* (2013.01)

(58) Field of Classification Search
CPC ...... B60N 2/5866; B60N 2/5875; B60N 2/58; B60N 2/5816; B60N 2/5891; B44C 1/247
(Continued)

(56) References Cited

U.S. PATENT DOCUMENTS 3,014,226 A * 12/1961 Wilfert ............... B60N 2/5635
297/452.47
3,381,999 A * 5/1968 Steere, Jr. ............ A47C 27/144
264/129
(Continued)

FOREIGN PATENT DOCUMENTS

AT 1 532 U1 7/1997
DE 11 2005 000 946 T5 7/2007
(Continued)

*Primary Examiner* — Jose V Chen
(74) *Attorney, Agent, or Firm* — Marshall & Melhorn, LLC (57) ABSTRACT

A cushion cover (100), in particular for a vehicle seat (1), includes a surface layer (102) and at least one embossing (120) in the surface layer (102). A cavity (122) on the rear face of the at least one embossing (120) is at least partly filled with an insert (106). A method for producing a cushion cover (100), in particular for a vehicle seat (1), is also provided, including producing a surface layer (102) and at least one embossing (120). The surface layer (102) is provided with the at least one embossing (120) in a tool (10), and a rear face of the at least one embossing (120) is at least partly filled with an insert (106) in an additional method step.

18 Claims, 5 Drawing Sheets

(58) Field of Classification Search
USPC .................................. 297/452.61, 452.58
See application file for complete search history.

(56) References Cited

U.S. PATENT DOCUMENTS

| | | | | | |
|---|---|---|---|---|---|
| 3,487,134 | A | * | 12/1969 | Burr | B29C 33/405 264/219 |
| 3,499,065 | A | * | 3/1970 | Hitchcock | B29C 44/145 264/45.3 |
| 4,323,410 | A | * | 4/1982 | Urai | B29C 44/5636 156/228 |
| 4,403,356 | A | * | 9/1983 | Urai | A47C 7/18 5/653 |
| 4,715,916 | A | * | 12/1987 | Shimada | B29C 51/082 156/213 |
| 4,718,153 | A | * | 1/1988 | Armitage | B29C 44/569 156/72 |
| 5,397,162 | A | * | 3/1995 | Huang | B62J 1/00 297/195.1 |
| 6,345,865 | B1 | * | 2/2002 | Ashida | B62J 1/00 297/195.1 |
| 2004/0217555 | A1 | | 11/2004 | Willat et al. | |
| 2013/0316141 | A1 | * | 11/2013 | Kammerer | D06N 3/0095 428/151 |
| 2014/0239697 | A1 | | 8/2014 | Nii et al. | |
| 2017/0305126 | A1 | * | 10/2017 | Takeshita | B32B 27/12 |
| 2017/0305318 | A1 | * | 10/2017 | Sekino | B60N 2/58 |
| 2017/0334127 | A1 | * | 11/2017 | Kitano | B29C 59/04 |
| 2018/0099594 | A1 | * | 4/2018 | Min | B32B 27/06 |

FOREIGN PATENT DOCUMENTS

| | | |
|---|---|---|
| DE | 10 2006 021 919 A1 | 11/2007 |
| DE | 20 2012 101 689 U1 | 7/2012 |
| EP | 0 255 187 A2 | 2/1988 |
| KR | 92 000 5679 B1 | 7/1992 |

\* cited by examiner

CUSHION COVER, IN PARTICULAR FOR A VEHICLE SEAT, AND METHOD FOR PRODUCING A CUSHION COVER

CROSS REFERENCE TO RELATED APPLICATIONS

This application is a United States National Phase Application of International Application PCT/EP2015/073373 filed Oct. 9, 2015 and claims the benefit of priority under 35 U.S.C. § 119 of German Applications DE 10 2014 221 125.5, filed Oct. 17, 2014 and DE 10 2015 209 332.8 filed May 21, 2015, the entire contents of which are incorporated herein by reference.

FIELD OF THE INVENTION

The invention relates to a cushion cover, in particular for a vehicle seat, having a surface layer and at least one embossing in the surface layer, and to a method for producing a cushion cover having a surface layer and at least one embossing.

BACKGROUND OF THE INVENTION

A method for configuring a three-dimensional embossing in a cushion cover for a vehicle seat is known from DE 10 2006 021 919 A1. The embossing, which is referred to as a marking, is incorporated into a surface layer of leather. The shape of the embossing is subsequently set in that the reverse side of the surface layer is provided with a blocking lining and is treated with a lacquer.

SUMMARY OF THE INVENTION

The invention is based on an object of improving a cushion cover and a method for producing a cushion cover of the type mentioned at the outset, in particular of providing a cushion cover with a decorative three-dimensional design that is configured in a localized manner. Concave and convex shapes are to be generated, in particular. A cushion cover having concave and convex shapes that are configured in a localized manner is to be provided, in particular. The embossing is to be stabilized, in particular. The embossing is to be designed to be breathable, in particular. The embossing is to have a soft surface touch, in particular.

This object is achieved according to the invention by a cushion cover, in particular for a vehicle seat, having a surface layer and at least one embossing in the surface layer, wherein a cavity on the reverse side of the at least one embossing is at least partially filled with an insert.

The embossing is stabilized on account of a cavity on the reverse side of the embossing being at least partially filled with an insert. The reverse side of the embossing is understood to be that side of the embossing that faces away from a visible surface of the surface layer. The cavity in particular is that space that is located in the region of the embossing, between an embossed reverse side of the surface layer and an area that is defined by the non-embossed neighboring region of the surface layer. In the case of a surface layer that is provided with a carrier layer, the cavity can be that space in the region of the embossing, between an embossed reverse side of the carrier layer and an area that is defined by the non-embossed neighboring region of the carrier layer.

The surface layer can be a leather. The surface layer can be a fabric. The surface layer can be a woven fabric. The surface layer can be a warp-knitted or weft-knitted fabric. The surface layer can be a textile material. The surface layer can be any deformable material that is known per se and that is suitable as the visible surface material of a cushion.

A carrier layer can be disposed below the surface layer. In this context, below means that the carrier layer is disposed on that side of the surface layer that faces away from a visible surface of the cushion cover. The carrier layer can additionally stabilize and/or seal the surface layer.

The embossing can be configured exclusively in the surface layer. The insert in this instance is in direct contact with the reverse side of the surface layer. In this context, reverse side means a side of the surface layer that faces away from a visible surface of the cushion cover. The cavity that is formed by the embossing comprises a volume which results from a comparison between the embossed surface layer and the previously non-embossed surface layer in the region of the embossing. The cavity can be partially filled with an insert. As opposed to the cavity being completely filled, this saves material and weight. The cavity can be completely filled with an insert. This stabilizes the surface material in the best possible manner.

The embossing can be configured in the surface layer and in a carrier layer that is connected to the surface layer in particular in a planar manner. The insert can be disposed between the surface layer and the carrier layer. Alternatively, the insert can be adjacent exclusively to the carrier layer, in particular on a side of the carrier layer that faces away from the surface layer. The cavity that is formed by the embossing in this instance comprises a volume that results from a comparison between the embossed carrier layer and the previously non-embossed carrier layer in the region of the embossing. The cavity can be partially filled with an insert. The cavity can be completely filled with an insert.

The carrier layer can be a non-woven material. In principle, the carrier layer can be composed of any carrier material for cushion covers that is known from the prior art.

The cushion cover can have a plurality of embossings and thus a plurality of cavities. Each of these cavities can be filled with in each case one insert. The inserts herein can be configured in a mutually independent manner. A plurality of inserts can be interconnected. A plurality of inserts can be integrally interconnected. The material of the inserts can project from the embossings in a direction that faces away from the surface layer. A tier of insert material can have a planar basic shape having molded inserts.

The at least one insert can be a foam material. The at least one insert can be foam-molded in the cavity. The at least one insert can be a PU foam material. The at least one insert can be an organic material. The at least one insert can have animal fibers, for example horsehair. The at least one insert can have vegetable fibers, for example coir. The at least one insert can have synthetic fibers.

The cushion cover on that side of the insert that faces away from the surface material can have a foam tier which renders the cushion cover softer. The foam tier can be provided with an additional woven fabric layer, for example of a woven cotton fabric. The woven fabric layer can be the lowermost tier of the cushion cover, that is to say form that reverse side of the cushion cover that faces away from a visible surface of the cushion cover. The woven fabric layer can also bear directly, that is to say without any interdisposed foam tier, on the surface layer and/or the carrier layer and/or the inserts.

Individual tiers of the cushion cover can be interconnected by means of a high-frequency welding method.

The cushion cover preferably only in portions has one embossing or a plurality of embossings. Preferably an area of the surface layer having an area percentage of at least 50%, most preferably at least 80%, of the surface layer is without embossing. Preferably a contiguous area of the surface layer having an area percentage of at least 50%, most preferably at least 80%, of the surface layer is without embossing. Thus, preferably, at most 50%, most preferably at most 20%, of the surface layer is embossed. The surface layer particularly preferably has one or a plurality of embossings only in a localized manner. By virtue of the embossing, the cushion cover can be non-symmetrical in relation to a central plane of the vehicle seat.

The object is moreover achieved by a method for producing a cushion cover, in particular for a vehicle seat, having a surface layer and at least one embossing, wherein the surface layer is provided with the at least one embossing in a tool, and in a further method step a reverse side of the embossing is at least partially filled with an insert.

The surface layer preferably is connected to a carrier layer, wherein the surface layer and the carrier layer are provided with the at least one embossing in the tool.

The embossing can be incorporated into the surface layer and/or the carrier layer at room temperature. Alternatively, the embossing can also be incorporated into the surface layer and/or the carrier layer at a temperature that is elevated in relation to the room temperature. An adhesive that cures when exposed to heat can interconnect individual layers or tiers of the cushion cover.

In a potential further method step, a foam tier can be applied to that side of the cushion cover that faces away from the surface layer. On account thereof, the comfort and the surface touch of the cushion cover can be additionally enhanced.

In a potential further method step, a woven fabric layer can be applied to that side of the cushion cover that faces away from the surface layer. The woven fabric layer increases the wear resistance of the cushion cover.

The method according to the invention for producing a cushion cover can be carried out by means of a tool for producing the cushion cover. A tool for producing the cushion cover is preferably an embossing tool. A tool for producing the cushion cover preferably has a male mold having elevations, and a female mold having depressions. The tool, in particular for producing prototype cushion covers, can be composed of wood. The tool in particular for a mass production of cushion covers, can be composed of aluminum.

A cushion cover having a decorative three-dimensional design is provided by way of the cushion cover according to the invention and of the method according to the invention for producing a cushion cover. Concave and convex shapes can be generated in the cushion cover. Embossings in the cushion cover can be stabilized in a sustainable manner. The embossing is in particular breathable and has a soft surface touch.

The invention is explained in more detail hereunder by means of advantageous exemplary embodiments that are illustrated in the figures. However, the invention is not limited to these exemplary embodiments. The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2b is a view showing a section through the detail II of FIG. 2a;

FIG. 7b is a view showing a perspective view of the embossing in the cushion cover of FIG. 7a;

FIG. 8b is a view showing a perspective view of the embossing in the cushion cover of FIG. 8a; and FIG. 9 is a view showing a section through an embossing of the cushion part of FIG. 8a.

DESCRIPTION OF THE PREFERRED EMBODIMENTS

Figure 5:
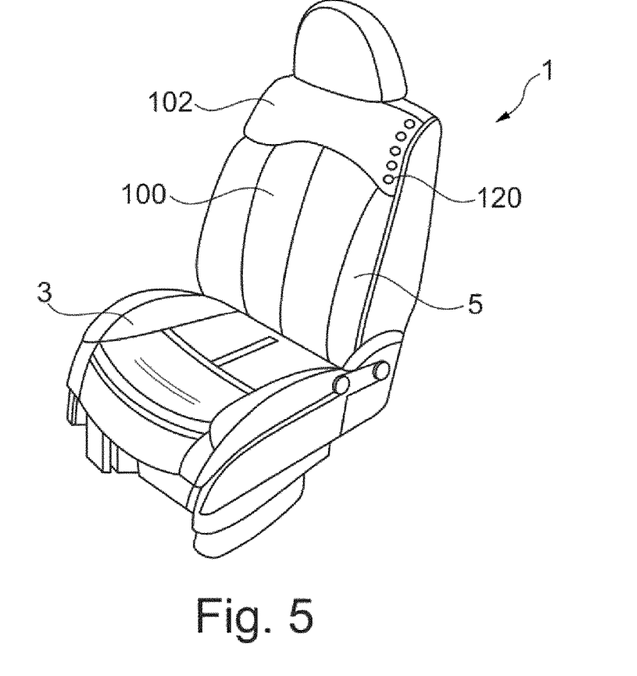
FIG. 5 is a view showing a vehicle seat having a cushion cover according to the invention.
Figure 6A:
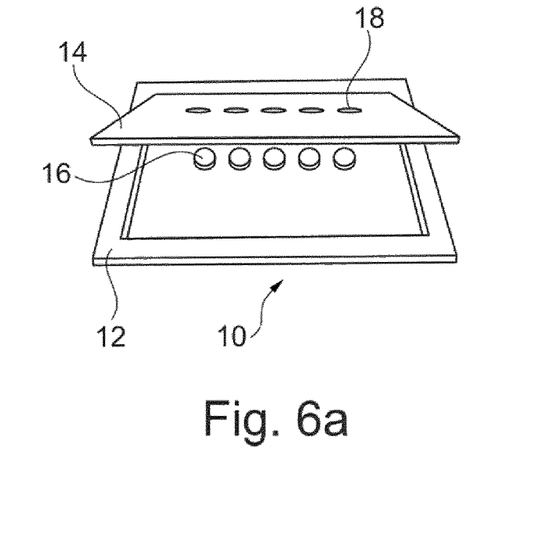
FIG. 6a is a view showing a tool for producing a cushion cover according to the invention, in an opened state.
Figure 6B:
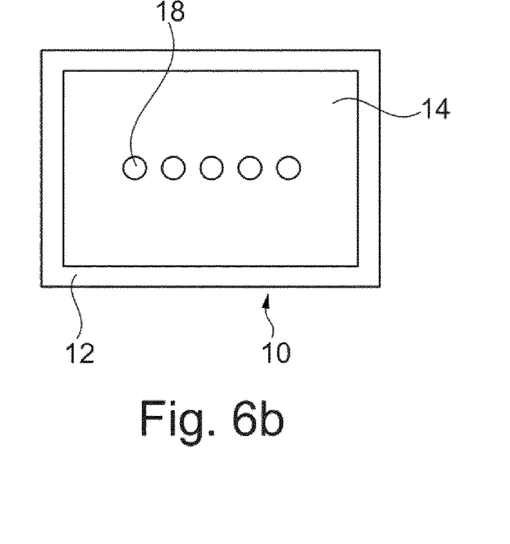
FIG. 6b is a view showing a tool for producing a cushion cover according to the invention, in a closed state.

Referring to the drawings, a vehicle seat 1 that is illustrated in FIG. 5 comprises a seat part 3 and a backrest 5 that is fastened to the latter. The backrest 5 has a load-bearing backrest structure and a cushion that covers the backrest structure. A foam part of the cushion is provided with a cushion cover 100 or is configured so as to be integral to the latter.

The cushion cover 100 in a localized manner has a plurality of embossings 120, for example an emblem or a brand logo.

Figure 1:
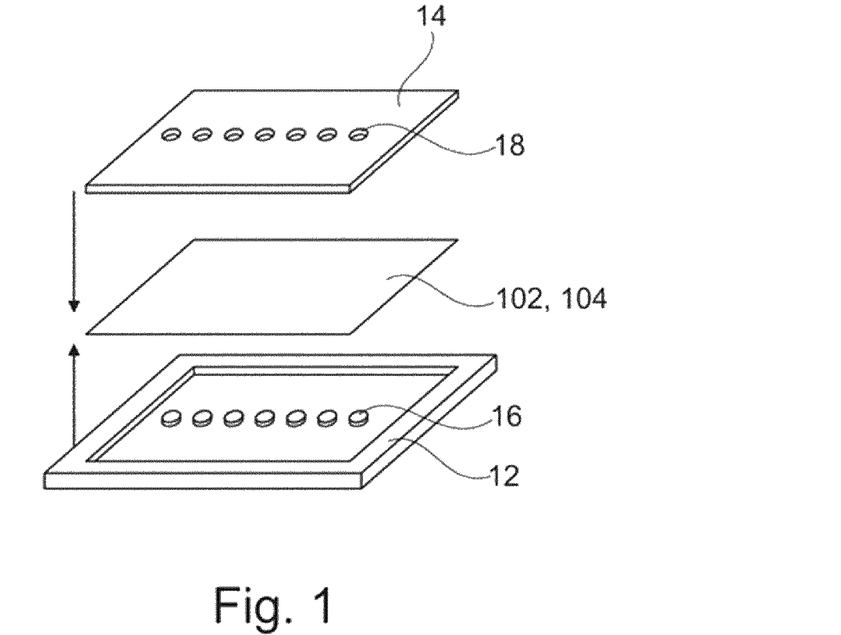
FIG. 1 is a view showing a female mold and a male mold of a tool for producing a cushion cover according to a first exemplary embodiment, and a surface layer that is provided with a carrier layer and is disposed between the female mold and the male mold, prior to an embossing step.

The production of the cushion cover 100 is illustrated in FIGS. 1 to 4. In a first method step that is illustrated in FIG. 1, a surface layer 102, provided with a carrier layer 104, of the cushion cover 100 is disposed between a female mold 14, having a plurality of depressions 18, and a male mold 12, having a plurality of elevations 16, of a tool 10. The elevations 16 are complementary to the depressions 18. The depressions 18 in the exemplary embodiment are embodied as through bores such that a direct localized treatment of the surface layer 102, for example by heating, radiating, spraying, soaking, or the like, is possible during embossing. The thickness of the female mold 14 in the exemplary embodiment corresponds to approximately the height of the elevations 16 of the male mold 12.

The female mold 14 and the male mold 12 are subsequently converged. The elevations 16 of the male mold 12 herein deform the surface layer 102 and the carrier layer 104 in that, by means of the elevations 16, material of the surface layer 102 and of the carrier layer 104 is pushed into the depressions 18 of the female mold 14. The tool 10 remains in a closed state for a defined period of time. The surface layer 102 and the carrier layer 104 are preferably heated in the tool 10 such that the deformation is performed at a temperature that is elevated in relation to room temperature. In a variation of the exemplary embodiment, the surface layer 102 can additionally be welded to the carrier layer 104 under the influence of high frequency, for example ultrasound.

Figure 2A:
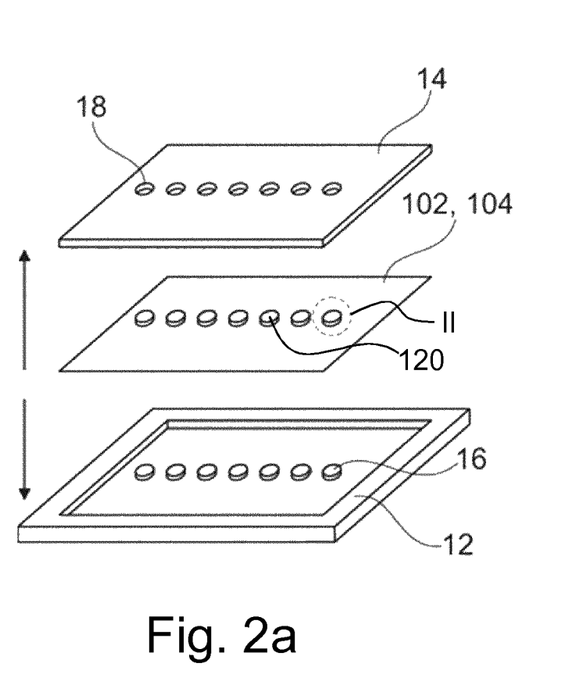
FIG. 2a is a view showing the female mold and the male mold of FIG. 1, and the surface layer that has the carrier layer and is disposed between the female mold and the male mold, after the embossing step.
Figure 2B:
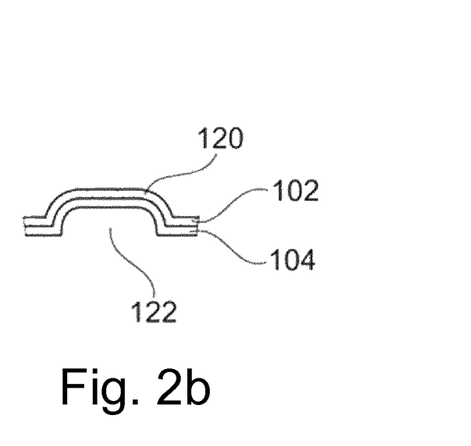

In a further method step that is illustrated in FIG. 2a, the surface layer 102 that is provided with the carrier layer 104 is removed from the tool 10. The surface layer 102 and the carrier layer 104 now have a plurality of embossings 120, a total of seven in FIG. 2a, which in a localized manner protrude from the surface layer 102 in relation to neighboring regions of the surface layer 102. Respective cavities 122 are located on the reverse side of the embossings 120.

Figure 3A:
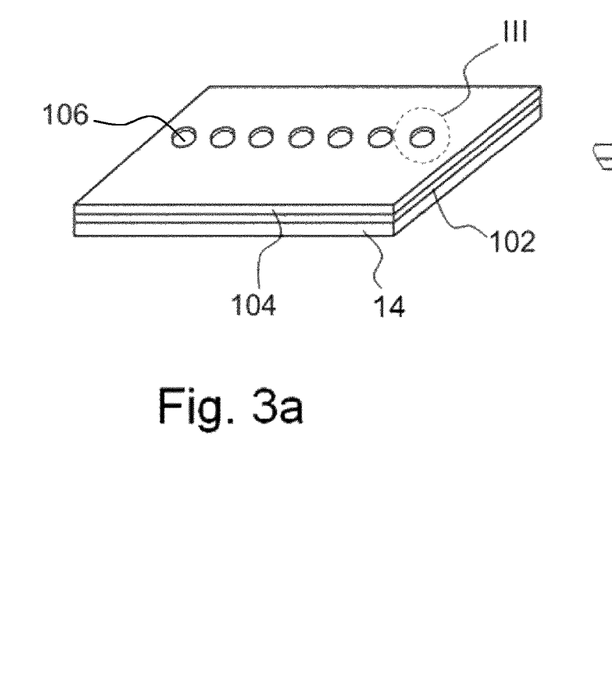
FIG. 3a is a view showing the surface layer having the carrier layer of FIG. 2, mounted on a rotated female mold, after an insert has been incorporated into the embossed cavities.
Figure 3B:
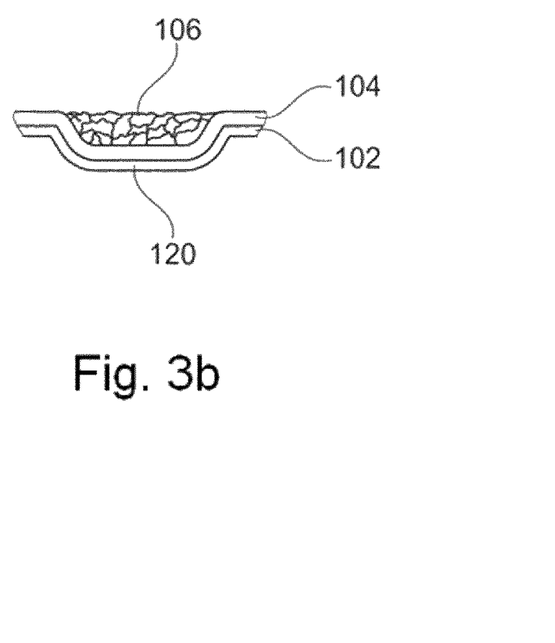
FIG. 3b is a view showing a section through the detail III of FIG. 3a, but without the female mold.

In a further method step that is illustrated in FIG. 3a, the cavities 122 are filled with inserts 106 that are composed of a foam material. This can be performed outside the tool 10, or the female mold 14 of the tool 10 is rotated and the surface layer 102 that is provided with the carrier layer 104 is inserted into the female mold 14. The cavities 122 of the surface layer 102 that is provided with the carrier layer 104 point upward. The cavities 122 are subsequently filled with foam.

Figure 4:
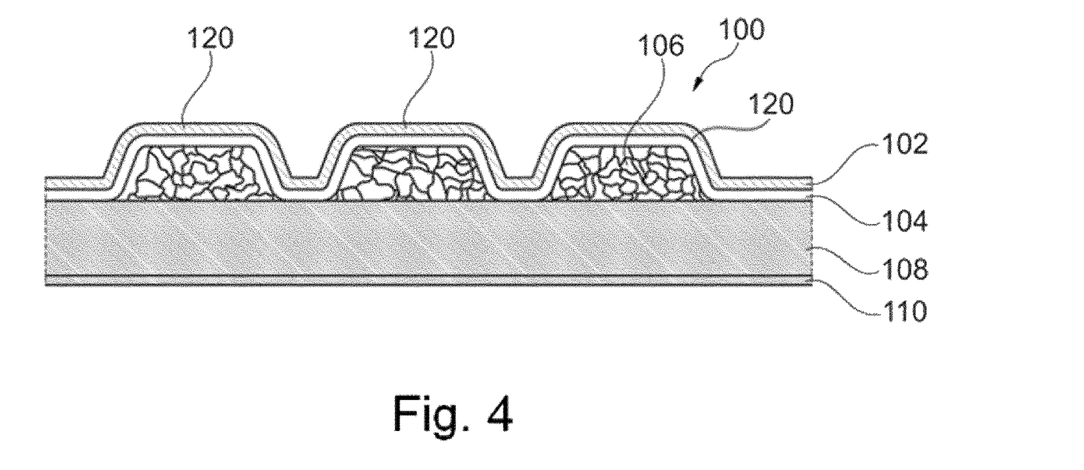
FIG. 4 is a view showing a section through a cushion cover having an additional foam tier and a woven fabric layer.

FIG. 4 shows a section through a cushion cover 100 which in further method steps is additionally provided with a foam tier 108 and a woven fabric layer 110. In variations of the exemplary embodiment the foam tier 108 and/or the woven fabric layer 110 can be omitted.

FIGS. 7a to 10 show exemplary embodiments having dissimilarly molded embossings 120. However, the embossings 120 can also have shapes that deviate from the exemplary embodiments.

Figure 7A:
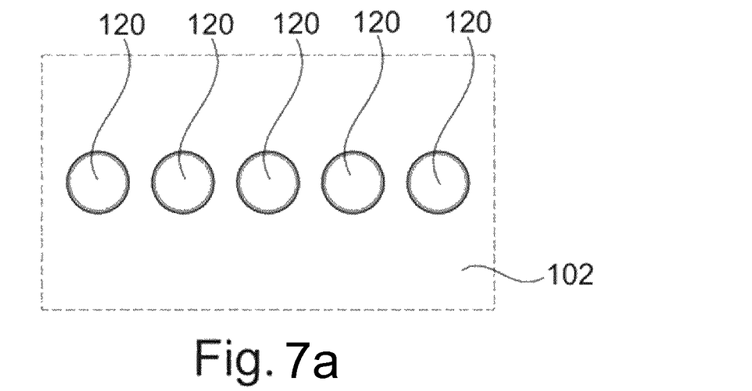
FIG. 7a is a view showing a plan view of an embossing in a cushion cover according to a second exemplary embodiment.
Figure 7B:
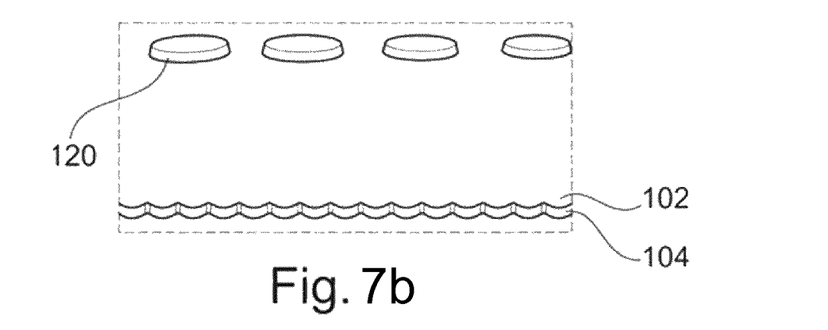

FIGS. 7a and 7b show a linear arrangement of a plurality of circular-cylindrical pot-shaped embossings 120.

Figure 8A:
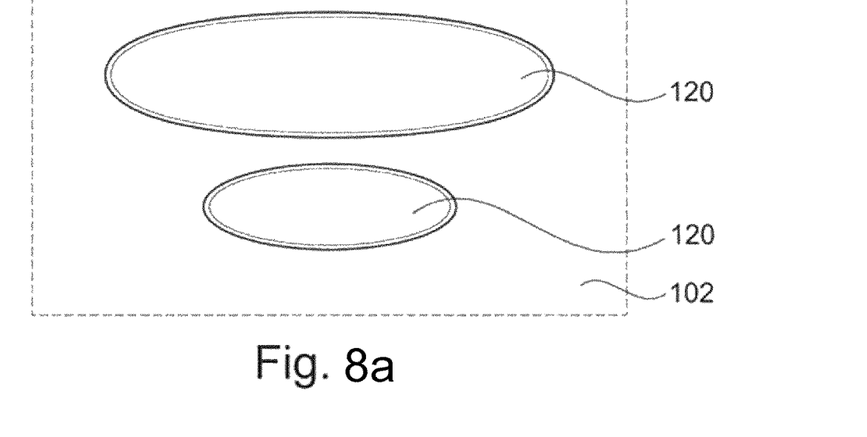
FIG. 8a is a view showing a plan view of an embossing in a cushion cover according to a third exemplary embodiment.
Figure 8B:
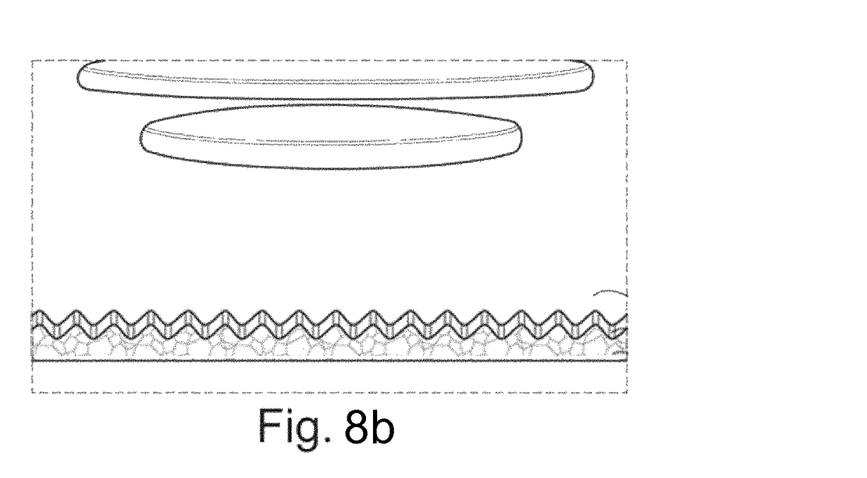
Figure 9:
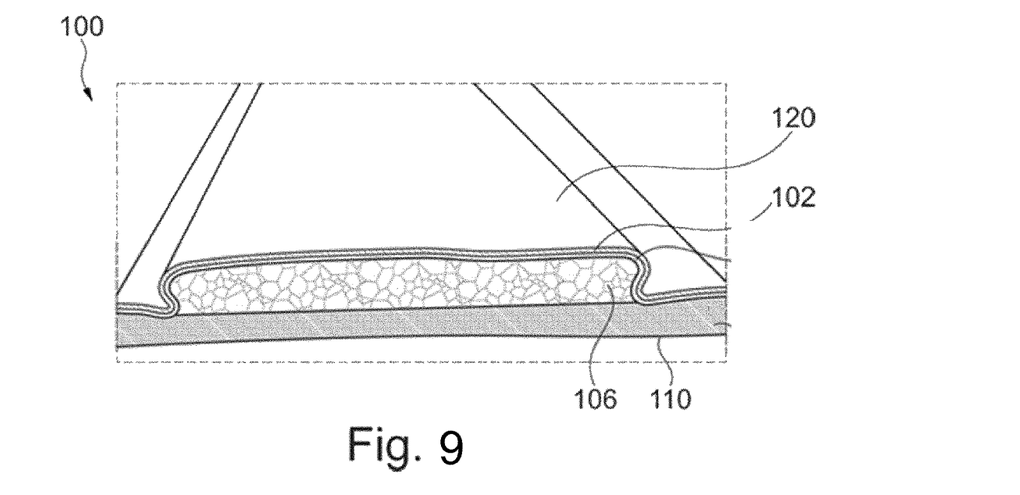

FIGS. 8a and 8b show an arrangement of a plurality of elliptic pot-shaped embossings 120. FIG. 9 shows a section along a major semiaxis of one of the elliptic embossings 120.

The features disclosed in the above description, the claims and the drawings can be important both individually and in combination in order for the invention to be implemented in the various configurations thereof.

Although the invention has been described in detail in the drawings and in the illustration above, the illustrations should be understood as being illustrative and exemplary, and not as restrictive. In particular, the selection of the proportions of the individual elements illustrated in the drawings should not be interpreted as being necessary or restrictive. Furthermore, the invention is in particular not restricted to the exemplary embodiments discussed. Further variants of the invention and their embodiment will be apparent to a person skilled in the art from the above disclosure, from the figures and from the claims.

While specific embodiments of the invention have been shown and described in detail to illustrate the application of the principles of the invention, it will be understood that the invention may be embodied otherwise without departing from such principles.

The invention claimed is:

1. A cushion cover for a vehicle seat, the cushion cover comprising:
    a cushion cover surface layer for covering a foam part of a cushion;
    at least one embossing in the cushion cover surface layer;
    an insert, wherein a cavity on the reverse side of the at least one embossing is at least partially filled with the insert; and
    a carrier layer disposed below the cushion cover surface layer, the carrier layer being in direct contact with the cushion cover surface layer.

2. The cushion cover as claimed in claim 1, wherein the at least one embossing is configured in the cushion cover surface layer and in the carrier layer.

3. The cushion cover as claimed in claim 1, wherein the insert is adjacent to the cushion cover carrier layer, the insert being in direct contact with the cushion cover carrier layer.

4. The cushion cover as claimed in claim 3, wherein the insert is adjacent to the carrier layer on a side of the carrier layer that faces away from the cushion cover surface layer, the carrier layer being in direct contact with the cushion cover surface layer, the insert being in direct contact with the carrier layer.

5. The cushion cover as claimed in claim 1, further comprising a foam tier is disposed on that side of the cushion cover that faces away from the cushion cover surface layer, the insert being in direct contact with the foam tier.

6. The cushion cover as claimed in claim 5, further comprising a carrier layer disposed below the surface layer, the carrier layer being in direct contact with the cushion cover surface layer.

7. The cushion cover as claimed in claim 1, wherein a woven fabric layer is disposed on a side of the cushion cover that faces away from the cushion cover surface layer.

8. The cushion cover as claimed in claim 7, wherein the woven fabric layer is disposed as a lowermost tier of the cushion cover.

9. The cushion cover as claimed in claim 1, wherein only portions of the cushion cover have one embossing or a plurality of embossings.

10. The cushion cover as claimed in claim 9, wherein an area percentage of at least 50% of the cushion cover surface layer is without embossing.

11. The cushion cover as claimed in claim 1, wherein a contiguous area of the surface layer having an area percentage of at least 50% of the cushion cover surface layer is without embossing.

12. A method for producing a cushion cover, for a vehicle seat, having a cushion cover surface layer and at least one embossing, the method comprising the steps of:
    providing the cushion cover surface layer for covering a foam part of a cushion with the at least one embossing in a tool; and
    at least partially filling a reverse side of the at least one embossing with an insert, wherein the surface layer is connected to a carrier layer, wherein the surface layer and the carrier layer are provided with the at least one embossing, the carrier layer being in direct contact with the surface layer, the carrier layer being in direct contact with the insert.

13. The method as claimed in claim 12, wherein in a further method step a foam tier is applied to a side of the cushion cover that faces away from the cushion cover surface layer.

14. The method as claimed in claim 13, wherein the insert is placed in a cavity defined by at least the cushion cover surface layer, wherein the foam tier is connected to the insert and the cushion cover surface layer after the insert is placed in the cavity.

15. The method as claimed in claim 12, wherein in a further method step a woven fabric layer is applied to a side of the cushion cover that faces away from the surface layer, the woven fabric layer having a surface configured to engage the foam part of the cushion.

16. The method as claimed in claim 12, wherein at least the cushion cover surface layer and the insert define a cushion cover structure, the cushion cover structure having a surface for engaging the foam part of the cushion.

17. The cushion cover as claimed in claim 1, wherein at least the cushion cover and the insert define a cushion cover structure for covering a cushion.

18. The cushion cover as claimed in claim 1, wherein the cushion cover structure comprises a foam part engaging surface for engaging the foam part of the cushion.

* * * * *